United States Patent [19]

Yashiro

[11] Patent Number: 5,754,169
[45] Date of Patent: May 19, 1998

[54] PEN INPUT DEVICE

[75] Inventor: Sadao Yashiro, Kawasaki, Japan

[73] Assignee: Fujitsu Limited, Kawasaki, Japan

[21] Appl. No.: 365,879

[22] Filed: Dec. 29, 1994

[30] Foreign Application Priority Data

Mar. 7, 1994 [JP] Japan .................. 6-036120

[51] Int. Cl.$^6$ .................. G09G 5/00; G06F 15/70
[52] U.S. Cl. .................. 345/173; 345/179; 345/157
[58] Field of Search .................. 345/173, 175,
345/179; 382/187, 189; 395/148, 138, 139, 149

[56] References Cited

U.S. PATENT DOCUMENTS

| | | | |
|---|---|---|---|
| 5,107,253 | 4/1992 | Meadows | 345/179 |
| 5,276,794 | 1/1994 | Lamb, Jr. | 395/149 |
| 5,347,295 | 9/1994 | Agulnick et al. | 345/179 |
| 5,389,745 | 2/1995 | Sakamoto | 345/179 |
| 5,428,805 | 6/1995 | Morgan | 345/179 |
| 5,448,475 | 9/1995 | Senao et al. | 382/187 X |
| 5,528,743 | 6/1996 | Tou et al. | 395/148 |
| 5,534,893 | 7/1996 | Hansen, Jr. et al. | 345/179 |
| 5,583,543 | 12/1996 | Takahashi et al. | 345/173 |

FOREIGN PATENT DOCUMENTS

| | | |
|---|---|---|
| 63-66627 | 3/1988 | Japan . |
| 2-301814 | 12/1990 | Japan . |

*Primary Examiner*—Raymond J. Bayerl
*Assistant Examiner*—John Suraci
*Attorney, Agent, or Firm*—Staas & Halsey

[57] ABSTRACT

A pen input device recognizes the fact that an input pen is located at a near position with respect to an input screen, and changes displayed images on a display screen on the basis of the recognition, so that complicated operation can be omitted and pen input is allowed with a feeling similar to that of writing on paper.

2 Claims, 10 Drawing Sheets

NAME : ▮
ADDRESS : ▮
OCCUPATION : ▮
DATE OF BIRTH : ▢ . ▢ . ▢

FAMILY : ▮ ▮ ▮ ▮

CASE HISTORY : ▮

NOTE : ▮ ▮

NAME : XXXX YYYYY
ADDRESS :
OCCUPATION :
DATE OF BIRTH :
FAMILY :
CASE HISTORY :
NOTE :

NAME
ADDRESS
OCCUPATION
DATE OF BIRTH
FAMILY
CASE HISTORY
NOTE

NAME
ADDRESS
OCCUPATION
DATE OF BIRTH

FIG. 10

PEN INPUT DEVICE

BACKGROUND OF THE INVENTION

1. Field of the Invention

The present invention relates to a pen input device which includes a tablet integrally provided with a display and an input pen and allows coordinate specifying input and hand-writing input with the input pen.

2. Description of Related Art

In connection with information processing equipments such as a personal computer and a word processor, input devices and systems have been improved to allow easy operation in recent years, and a pen input device, which includes an input pen and a display-integrated tablet having a display screen integral with an input screen, has been widely employed as desirable input device contributing to easy operation of information processing equipments.

Many kinds of pen input devices have such a structure that one can specify and input coordinates by touching a surface (input screen) of the tablet with a tip end of the input pen. The structure is realized by including a contact detector which detects the fact that the tip end of the input pen contacts with a position of certain coordinates on the input screen, and a processing circuit which carries out predetermined processing in response to this detection. According to the display-integrated tablet, a region including a coordinate position for contact with the input pen can be displayed on the display integrated with the input screen, and by changing the display successively, the respective specified regions on the input screen can be made correspond to a plurality of inputs respectively. Such an input device is capable of carrying out various kinds of inputs without an error.

Some kinds of pen input devices are constructed such that, in addition to the aforementioned coordinate specifying input, hand-writing of characters and graphics are allowed by contact scanning of the input pen on the input screen. This structure is realized by adding a recognition circuit which recognizes scanning paths of the input pen, which are obtained as strings of coordinates on the input screen, as character data or graphic data. Such pen input devices have attracted an attention as a device which releases an operator from a complicated input operation, such as a keyboard operation, during various kinds of data management operations requiring input of characters for a large number of input items.

In the pen input device allowing the hand-writing input, an input frame for hand-writing input is displayed on the tablet surface together with characters indicating an attribute thereof, and the scanning paths of the input pen within the displayed input frame are accepted as the hand-writing input. Owing to this structure., the device can be used with the same feeling as the conventional writing on paper.

In general data management, it is desired that an input screen including many input frames is entirely displayed so as to allow input while confirming the display. A lower limit, however, exists in an area of the input frame for hand-writing input. This is because an area not smaller than a certain degree is required in order to recognize the scanning paths of the input pen within the input frame as character data or graphic data. Accordingly, the input devices in the prior art have a structure in which a whole input screen is displayed in the normal state, and, when the hand-writing input is to be carried out, a predetermined input frame is magnified and displayed on the whole tablet surface or a portion thereof to allow hand-writing input.

The hand-writing input described above, however, requires operation for changing the display from the entire display to the input frame display, and vice versa. This operation is carried out utilizing, for example, coordinate specifying input with the input pen. However, when hand-writing input is performed for all input items, the above input operation, must be repeated for the respective input items, which requires of an operator complicated operation.

Also such a pen input device is now available with a tablet dedicated to hand-writing input is provided separately from a display-integrated tablet, and the hand-writing input is taken into the tablet dedicated to hand-writing input so as to display it. In this pen input device, however, input must be done for specifying coordinates in order to specify the input items, so that complicated operation cannot be avoided, and further the separate arrangement of the tablet dedicated to the input makes the structure complicated.

SUMMARY OF THE INVENTION

The present invention has been developed to overcome the above disadvantages, and it is an object of the invention to provide a pen input device which allows hand-writing input onto a tablet surface with feeling similar to that of ordinary hand-writing on paper without requiring complicated operation.

A pen input device according to the invention is characterized by being provided with a tablet having a display screen integral with an input screen, an input pen for performing coordinate specifying input by contact with the input screen and hand-writing input by contact scanning on the input screen, pen position recognition processing means for recognizing whether the input pen is in near position or remote position with respect to the input screen, and with display processing means for changing displayed contents on the display screen in accordance with recognition of nearness by the pen position recognition processing means.

Therefore, the input pen moved toward the input screen so as to perform the hand-writing input is recognized by the pen position recognition processing means, and the display processing means operates in accordance with this recognition to change images displayed on the display screen into a form suitable for the hand-writing input.

The pen input device according to the invention is additionally characterized by that the change processing is performed when a predetermined display is formed on the display screen and that this predetermined display includes an input frame for hand-writing input at a portion of the same.

Accordingly, the change of display can be surely performed when it is necessary, and meaningless change of display is prevented when it is unnecessary.

The pen input device according to the invention is characterized by that the processing for the change includes processing of magnifying and displaying the displayed contents at a partial region in the display screen, processing of shifting and displaying the displayed contents at a partial region in the display screen, or processing of combination of them, and is performed with respect to a region including the hand-writing input receiving frame.

Further, the pen input device according to the invention is characterized by that the processing for the change changes displayed images at a partial region on the display screen into different displayed images, and the changed displayed images includes a hand-writing input receiving frame.

Accordingly, a display form allowing hand-writing input is achieved by magnification of the partial region on the display screen, shift thereof or combination of them, or change to different displayed images.

Moreover, the pen input device according to the invention is characterized by that the pen position recognizing means includes region specifying means for specifying a region, which the input pen is approaching, on the input screen, and determines the partial region on the basis of the result of the specification.

Accordingly, the region specifying means specifies the region on the input screen which the input pen is approaching, and changes the display at the region corresponding to the specified region into the display form allowing the hand-writing.

Further, the pen input device according to the invention is characterized by that the processing for the change is released in accordance with the recognition of a remote position done by the pen position recognizing means or by predetermined coordinate specifying input with said input pen.

Accordingly, the change processing is released in accordance with the fact that the input pen located at the remote position is recognized or that the input pen is located at the predetermined coordinate specifying input position, and the displayed images before the change are restored.

The above and further objects and features of the invention will more fully be apparent from the following detailed description with accompanying drawings.

DESCRIPTION OF THE PREFERRED EMBODIMENTS

Embodiments of the invention will be described below with reference to the drawings.

Figure 1:
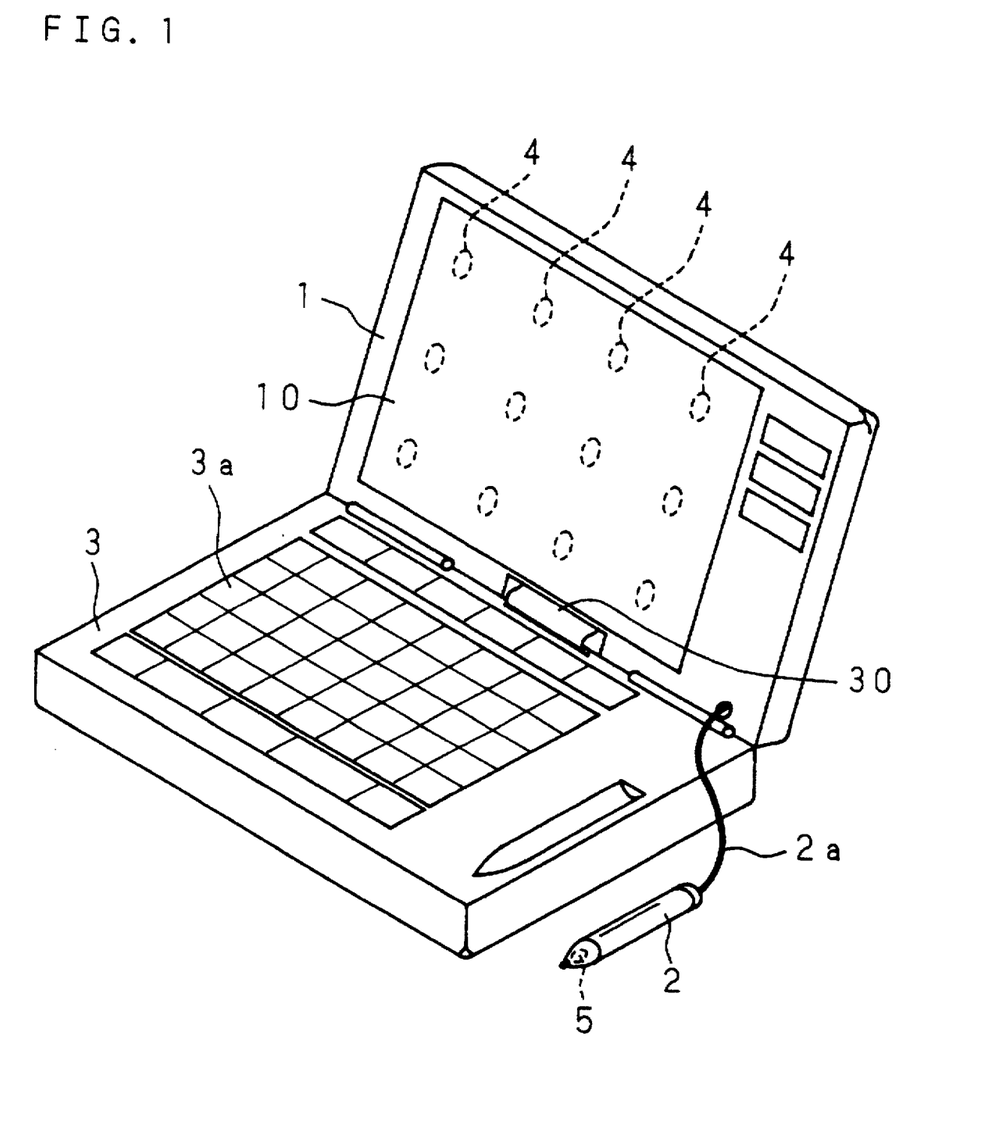
FIG. 1 is a perspective view showing an appearance of a pen input device of the invention.

FIG. 1 is a perspective view showing an appearance of a pen input device of an embodiment of the invention. The pen input device comprises a tablet 1 having a display screen integral with an input screen, and an input pen 2 which can input by contact onto the input screen of the tablet 1. Reference numeral "3" in FIG. 1 indicates a body housing which is provided at its upper surface with a keyboard 3a, i.e., input means. The tablet 1 is attached to the body housing 3 which opens and closes freely with its one edge as a pivot and forms a portable computer together with a computer unit built in the body housing 3. When it is used, a tablet surface 10 serving as an input screen as well as a display screen is faced toward an operator as shown in the figure.

The input pen 2 is connected at its base end 2a to the tablet 1 via a signal line 2a. Owing to transmission of signals via the signal line 2a, coordinate specifying input can be performed by contact the tip end of the input pen 2 with the tablet surface 10 and hand-writing input can be performed by carrying out contact-scanning. The tablet 1 is connected to the computer unit inside the body housing 3 via a bus 30 so that various kinds of signals can be transmitted. Results of the coordinate specifying input and hand-writing input by the input pen 2 on the tablet surface 10 are sent to the computer unit via the bus 30.

The tablet 1 includes, as shown in FIG. 1, a plurality of light receivers 4 which are arranged over the substantially whole tablet surface 10 with a uniform interval between each other so that they can receive infrared rays emitted toward the tablet surface 10. The input pen 2 is provided at an outer or inner side near its tip end with an infrared ray emitter 5.

The light receivers 4 and the light emitter 5 form a pen position sensing unit for sensing a relative position, i.e., remoteness and nearness of the input pen 2 with respect to the input screen, i.e., tablet surface 10. For example, the level of output signal generated by the light receivers 4 in accordance with reception of the light is compared with a predetermined reference level. When the output level is larger than the reference level, it is determined that the input pen 2 is near the surface 10. When the output level is smaller than the reference level, it is determined that the input pen 2 is remote from the surface 10. By providing a plurality of reference levels for comparison with the output signal of the receivers 4 the distance of the input pen 2 with respect to the tablet surface 10 can be sensed stepwise or continuously. Further, by identifying a particular light receiver 4 which generates the signal indicative of the near position of the input pen 2, the region (approaching region) which the input pen 2 is approaching is specified on the area of the tablet surface 10.

The pen position sensing device may have other structures than the above structure utilizing the infrared rays, provided that the output thereof is changed in accordance with the fact that whether the input pen 2 is in near position or remote position with respect to the tablet surface 10. For example, it may employ a structure disclosed in Japanese Patent Application Laid-Open No. 63-66627 (1988), in which an antenna coil entirely covering the tablet surface 10 generates a high-frequency wave to cause resonance of a resonant circuit built in the input pen 2, and the nearness and remoteness of the input pen 2 is determined on the basis of the level of this resonance signal. In this case, a plurality of antenna coils may be arranged at different regions on the tablet surface 10 to allow specification of the approaching region.

Figure 2:
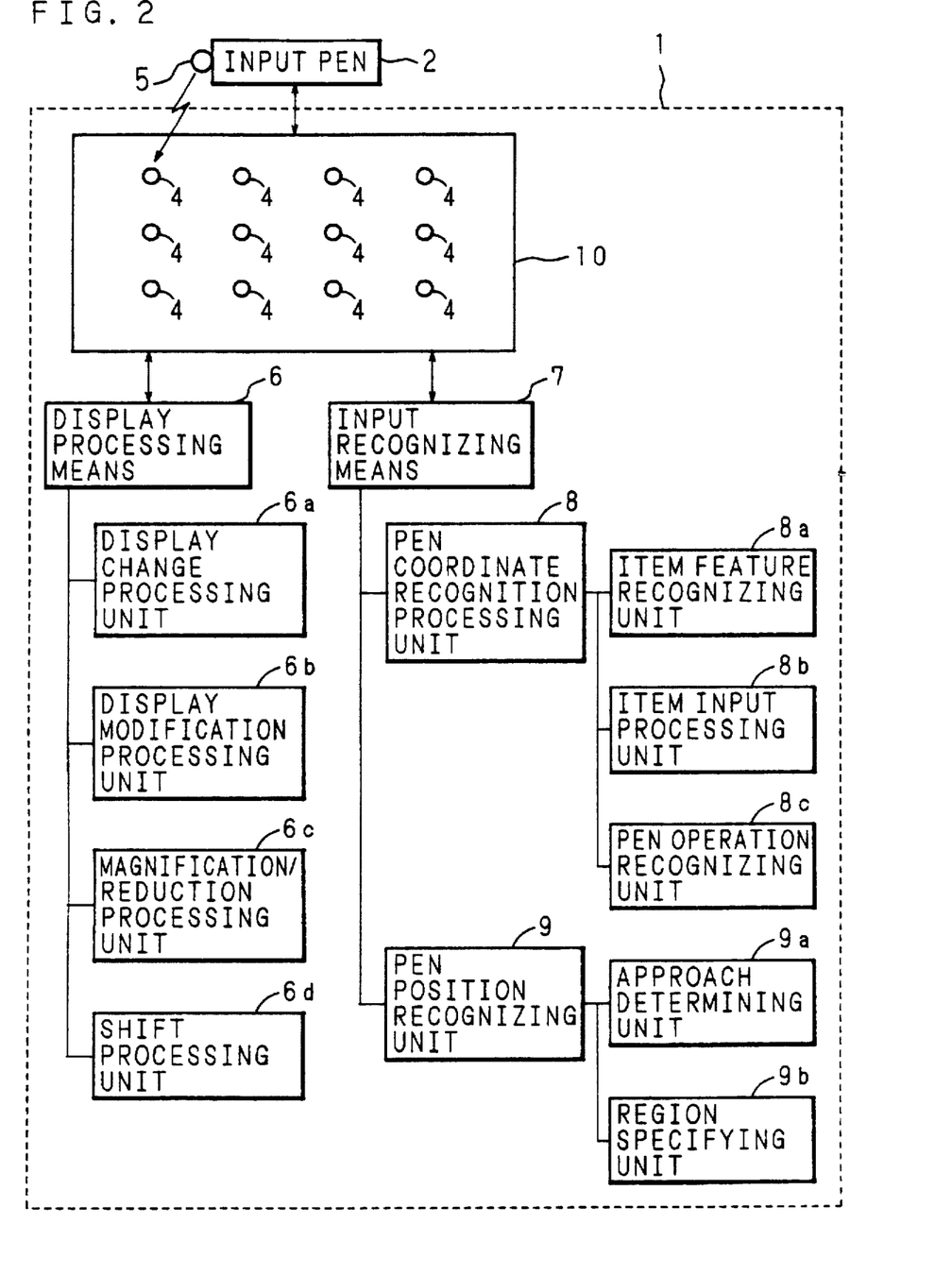
FIG. 2 is a block diagram showing a circuit configuration of the pen input device of the invention.

FIG. 2 is a block diagram showing a circuit structure of the pen input device according to the invention. As shown in the figure, the tablet 1 is provided with display processing means 6 and input recognizing means 7. These means are connected to the tablet surface 10 so that signal transmission is possible, and are also connected to each other so that signal transmission is possible.

The display processing means 6 is a control circuit which transmits and receives signals with the display screen, i.e., tablet surface 10, so as to change the display on the tablet surface 10. The display processing means comprises several portions such as a display change processing unit 6a, a display modification processing unit 6b, a magnification/ reduction processing unit 6c and a shift processing unit 6d. These processing units are the same as those employed in the conventional pen input device. More specifically, the display change processing unit 6a is operable to change displayed images on the tablet surface 10 into several forms. The display modification processing unit 6b is operable to perform modification of displayed images on the tablet surface 10, such as inversion of background color, half-tone dot meshing and change of color. The magnification/reduction processing unit 6c is operable to magnify/reduce a portion or a whole of the displayed contents on the tablet surface 10. The shift processing unit 6d is operable to shift a portion or a whole of the displayed contents on the tablet surface 10 to a predetermined position.

The input recognizing means 7 is a circuit which recognizes an input sent to the tablet surface 10 on the basis of signals transmitted and received from the input screen, i.e., tablet surface 10 and generates a control instruction to the display processing means 6 in order to change the displayed contents on the display screen, i.e., tablet surface 10. The input recognizing unit 7 comprises a pen coordinate recognition processing unit 8 for recognizing input (coordinate specifying input and hand-writing input) inputted by contact with the input pen 2, and a pen position recognition processing unit 9 for recognizing a relative position of the input pen 2 with respect to the tablet surface 10. Recognition of the relative position of the input pen 2 is performed on the basis of input formed by approaching of the input pen 2, i.e., input from the pen position sensor having the aforementioned structure.

The pen coordinate recognition processing unit 8 comprises an item feature recognizing unit, an item input processing unit 8b and a pen operation recognizing unit 8c. These are similar to those provided in a conventional pen input device. The item feature recognizing unit 8a is operable to recognize the fact that a coordinate position on the tablet surface 10 with which the input pen 2 contacts is in a specific previously set region. The item feature recognizing unit 8a the control instruction to the display processing means 6 in order that a predetermined display, which has been previously characterized, is performed in the specific region, when the unit 8a performs the above recognition. The item input processing unit 8b is operable to characterize a portion of the tablet surface 10 as the coordinate specifying input region or hand-writing input region. Such a characterization is performed correspondingly to the display on the tablet surface 10. Further, when the contact scanning of the input pen 2 is performed in the region characterized to allow the hand-writing input, the pen operation recognizing unit 8c operates to recognize the scanning paths as character data or graphic data.

Meanwhile, the pen position recognizing unit 9 comprises an approach determining unit 9a and a region specifying unit 9b. The pen position recognizing unit 9 is supplied with the output of the pen position sensor, and more specifically the output of the light receivers arranged on the tablet surface 10. In accordance with the procedure already described, the approach determining unit 9a is operable to determine the degree of approach of the input pen 2 with respect to the tablet surface 10. The region specifying unit 9b is operable to specify the region on the tablet surface 10 which the input pen 2 is approaching.

Figure 3:
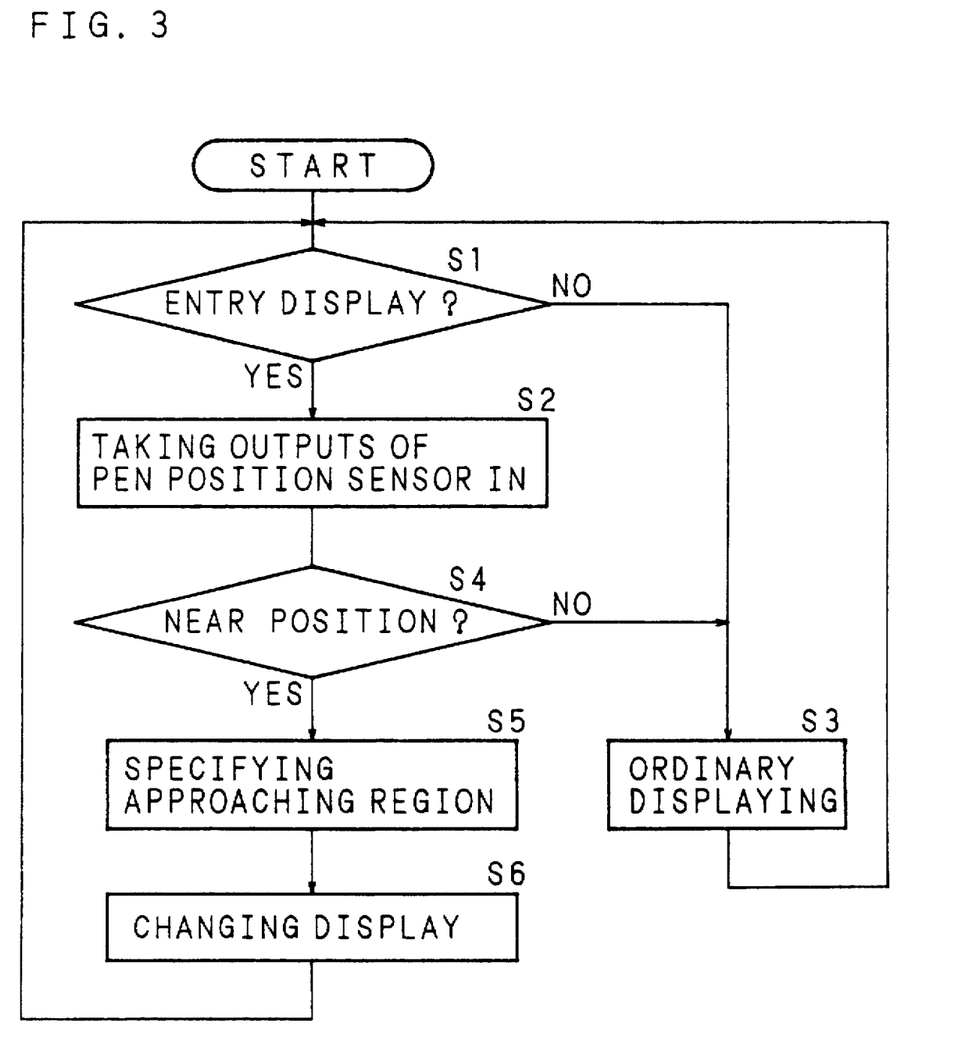
FIG. 3 is a flow chart showing contents a display changing operation.

The pen input device thus constructed according to the invention performs such a characteristic operation that the displayed images on the display screen, i.e., tablet surface 10 are changed in accordance with nearness and remoteness of the input pen 2 with respect to the input screen, i.e., tablet surface 10. FIG. 3 is a flow chart showing steps in the above change operations. FIGS. 4 to 8 shows examples of change displays performed by the change operations in the embodiment.

Figure 4:
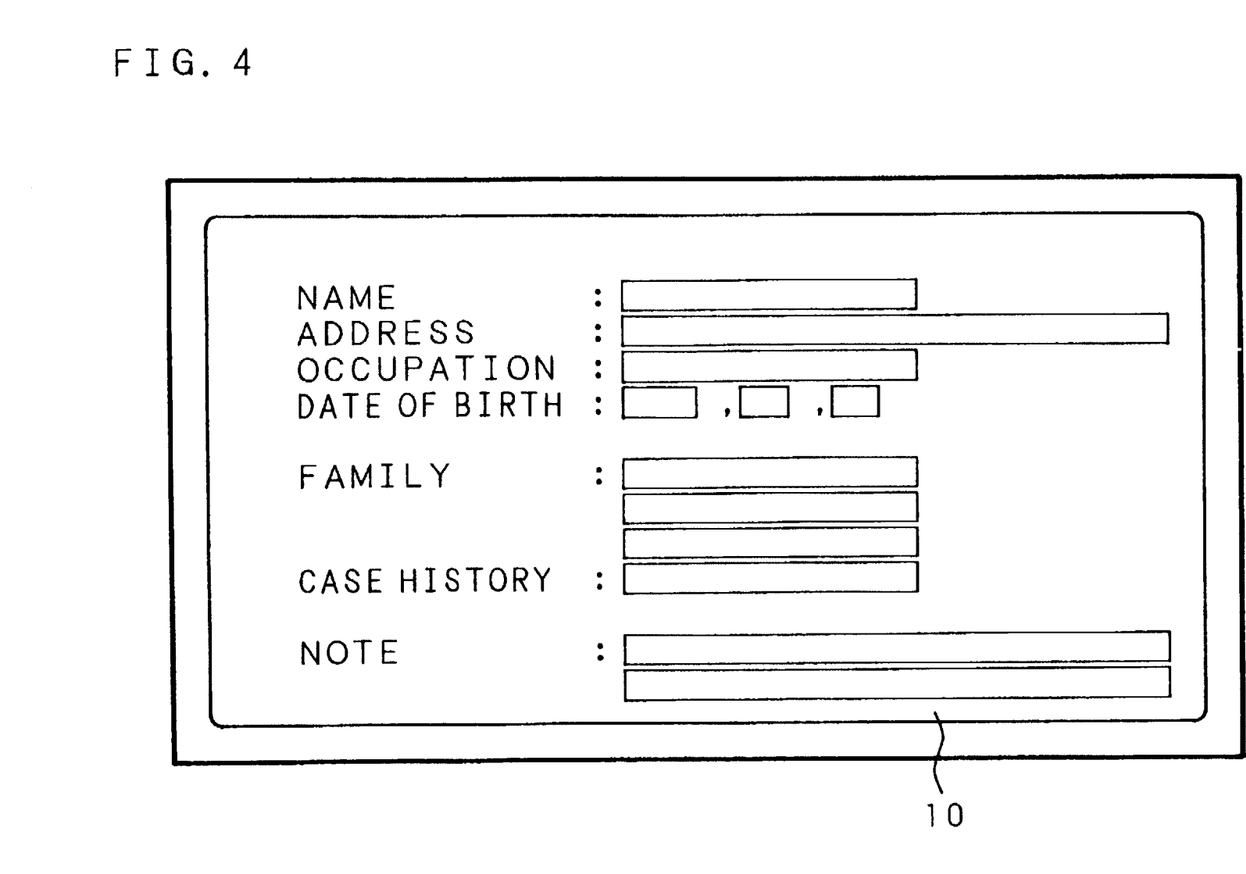
FIG. 4 is an explanatory view showing an embodiment of the display change.

Change of the displayed contents is performed only when the tablet surface 10 performs the display in certain manners such as an entry display composed of combination of a plurality of items and corresponding hand-writing input frames. FIG. 4 shows an example of the entry display. When the input pen 2 is brought into contact with the tablet surface 10 displaying initial images to perform a predetermined coordinate specifying input, the item feature recognizing unit 8a generates a control instruction to operate the display change processing unit 6a so as to display the images shown in FIG. 4.

In the flow chart shown in FIG. 3, the display change operation described above starts in response to power-on. At first, it is determined whether the display on the tablet surface 10 is in a state which allows hand-writing input (i.e., entry display) in step S1. When the entry display is active, the process advances to step S2. In other cases, the control instruction for the ordinary display is given to the display processing means 6 (step S3), and the process returns to step S1. The determination in step S1 is based on whether the item feature recognizing unit 8a has supplied the corresponding control instruction or not.

In step S2, the outputs of the pen position sensor, i.e., outputs of the light receivers 4 are taken in, and then, the approach determining unit 9a of the pen position recognition processing portion 9 determines whether the input pen 2 is in a near position (step S4). When that the input pen 2 is in a remote position, the control instruction for the ordinary display is supplied to the display processing means 6 (step S3), and the process returns to the step S1.

Meanwhile, as a result of the determination is step S4, when the level of light received by the light receivers 4 is sufficiently high, that the input pen 2 is in a near position, and the output of the pen position sensor which was taken in step S2 is used to specify the approaching region of the input pen 2 on the surface of the tablet surface 10 owing to the operation of the region specifying unit 9b of the pen position recognition processing unit 9 (step S5). Thereafter, the control instruction is given to the display processing means 6 so as to change the display into a predetermined form (step S6), and the process returns to step S1 to repeat the aforementioned procedure.

The change control instruction described above serves to change the display in the region specified in step 5 in various manners, and for example, in such a manner that the displayed contents in the specified region are magnified, are shifted to a predetermined position, are magnified and shifted in a combined manner, or are changed into a predetermined displayed images. This change of display is performed to allow the hand-writing input, and thus generally includes magnification display for enlarging the corresponding input frame to a size allowing the hand-writing input.

The change of display described above is performed by the corresponding processing unit in the display processing means 6. For example, when the change control instruction for magnification display is given, the magnification/ reduction processing portion 6c in the display processing means 6 operates to magnify the displayed images in the region, which the input pen 2 is approaching, on the display screen, i.e., tablet surface 10 without changing the images.

Figure 5:
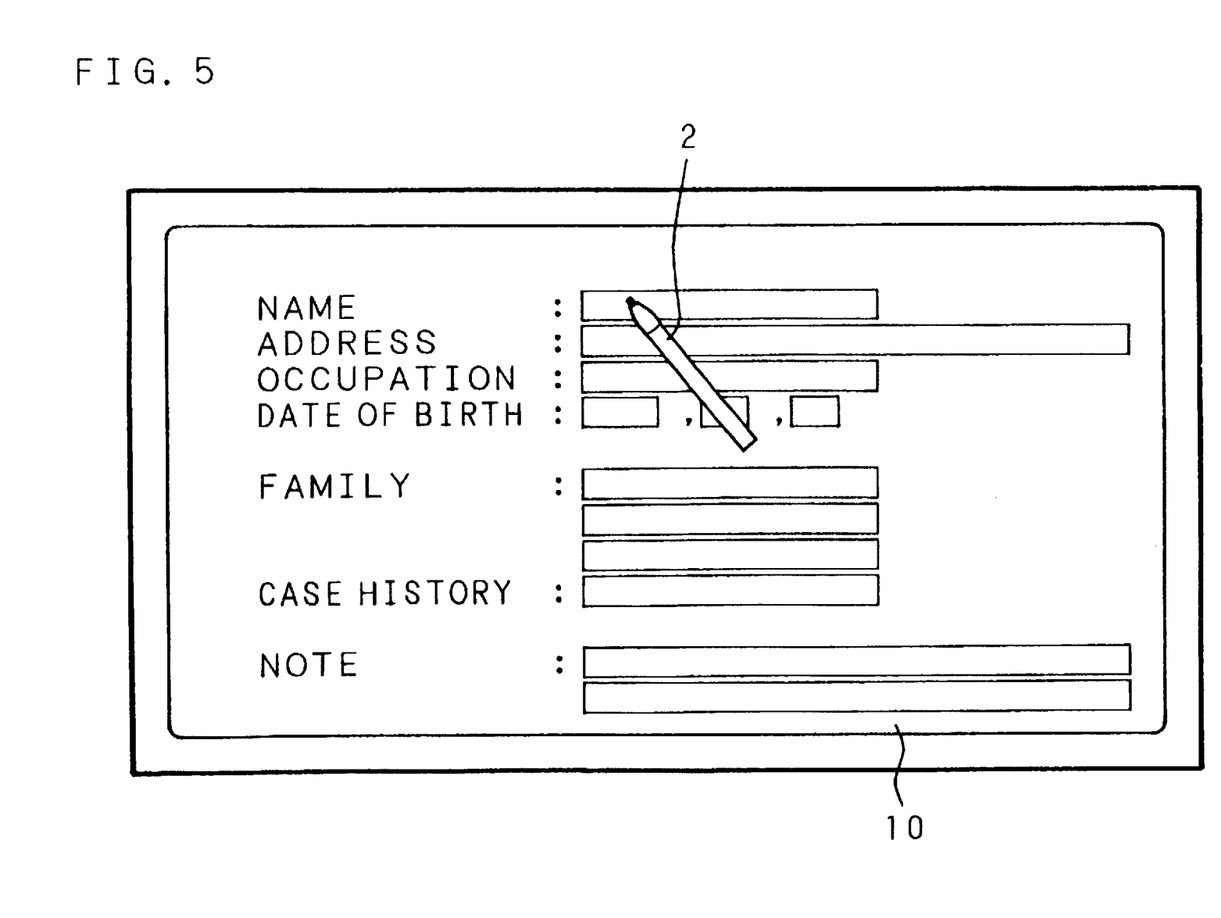
FIG. 5 is an explanatory view showing an embodiment of the display change.
Figure 6:
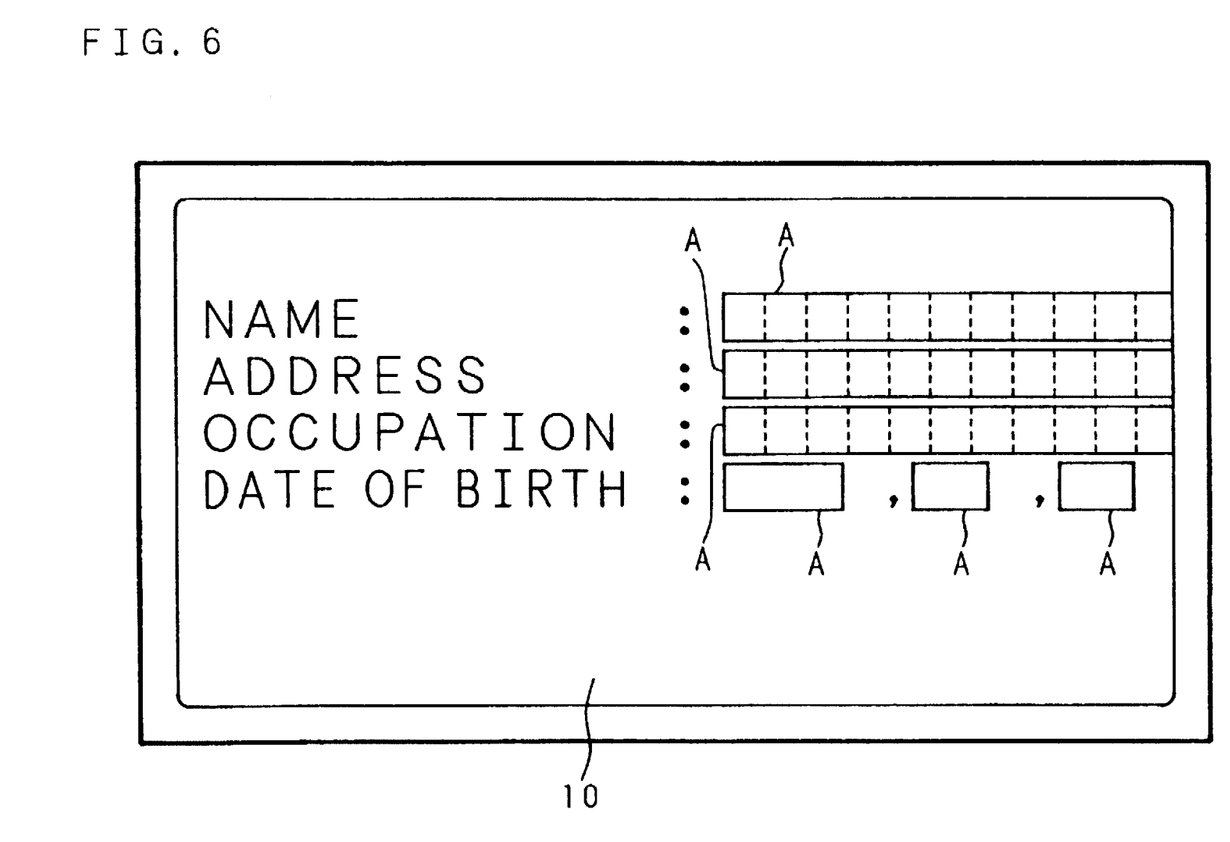
FIG. 6 is an explanatory view showing an embodiment of the display change.

Accordingly, when the input pen 2 is moved, as shown in FIG. 5, toward a position of a particular display item, e.g., "name" on the tablet surface 10 displaying the ordinary entry form as shown in FIG. 4, the approaching state is detected in step S4. The approaching region is then specified in step S5. As a result, the tablet surface 10 performs the display in such a manner that the region which the input pen 2 is approaching, i.e., the region including the aforementioned entry item and the corresponding hand-writing entry frame, is fully magnified as shown in FIG. 6.

Figure 7:
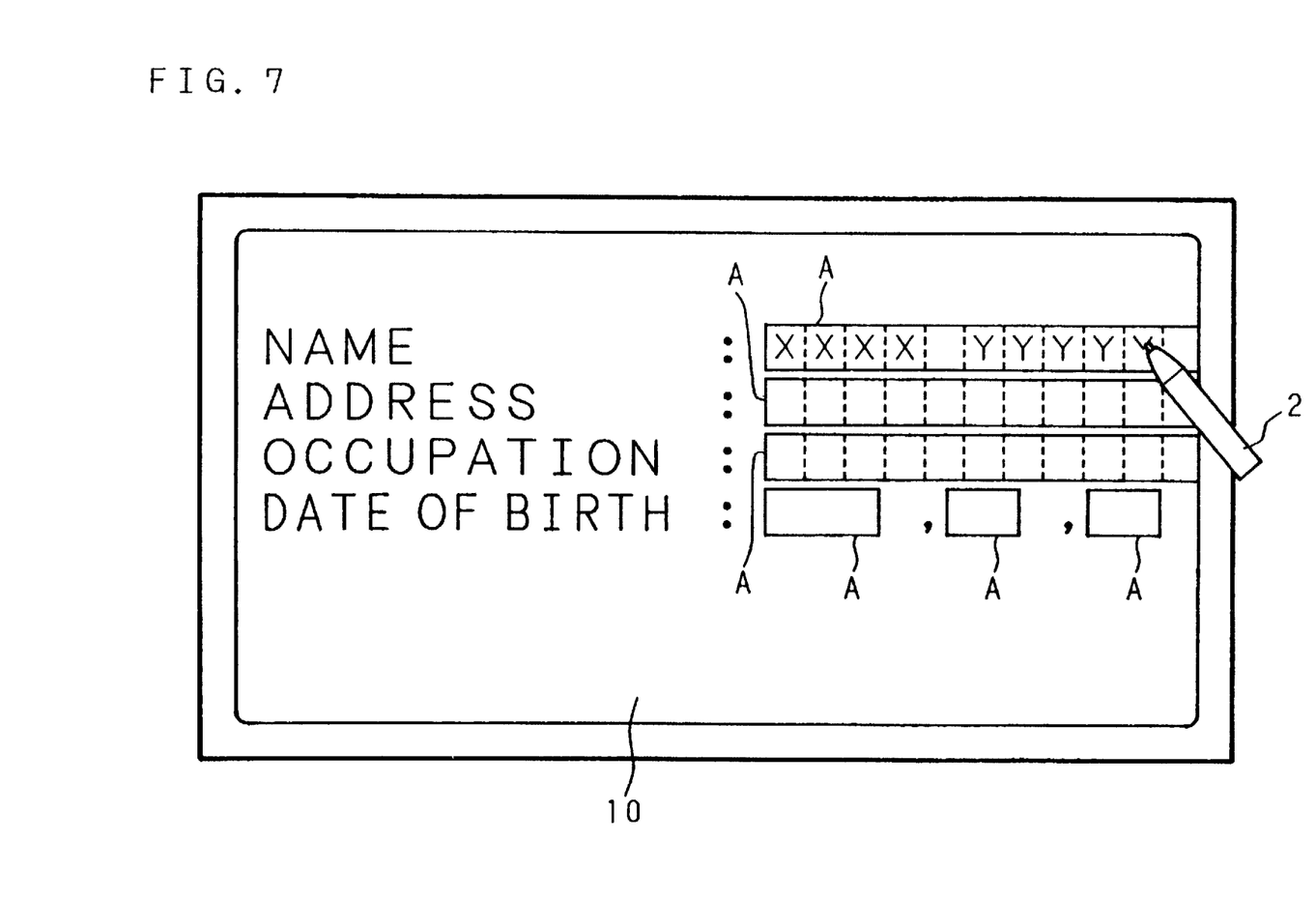
FIG. 7 is an explanatory view showing an embodiment of the display change.

Along with the display change described above, the item input processing unit 8b operates to characterize the predetermined region in the position of the entry item as a hand-writing input region A. When the input pen 2 is contact-scanned on the input region A as shown in FIG. 7, the scanning paths are recognized as character data or graphic data owing to operation of the pen operation recognizing unit 8c.

Figure 8:
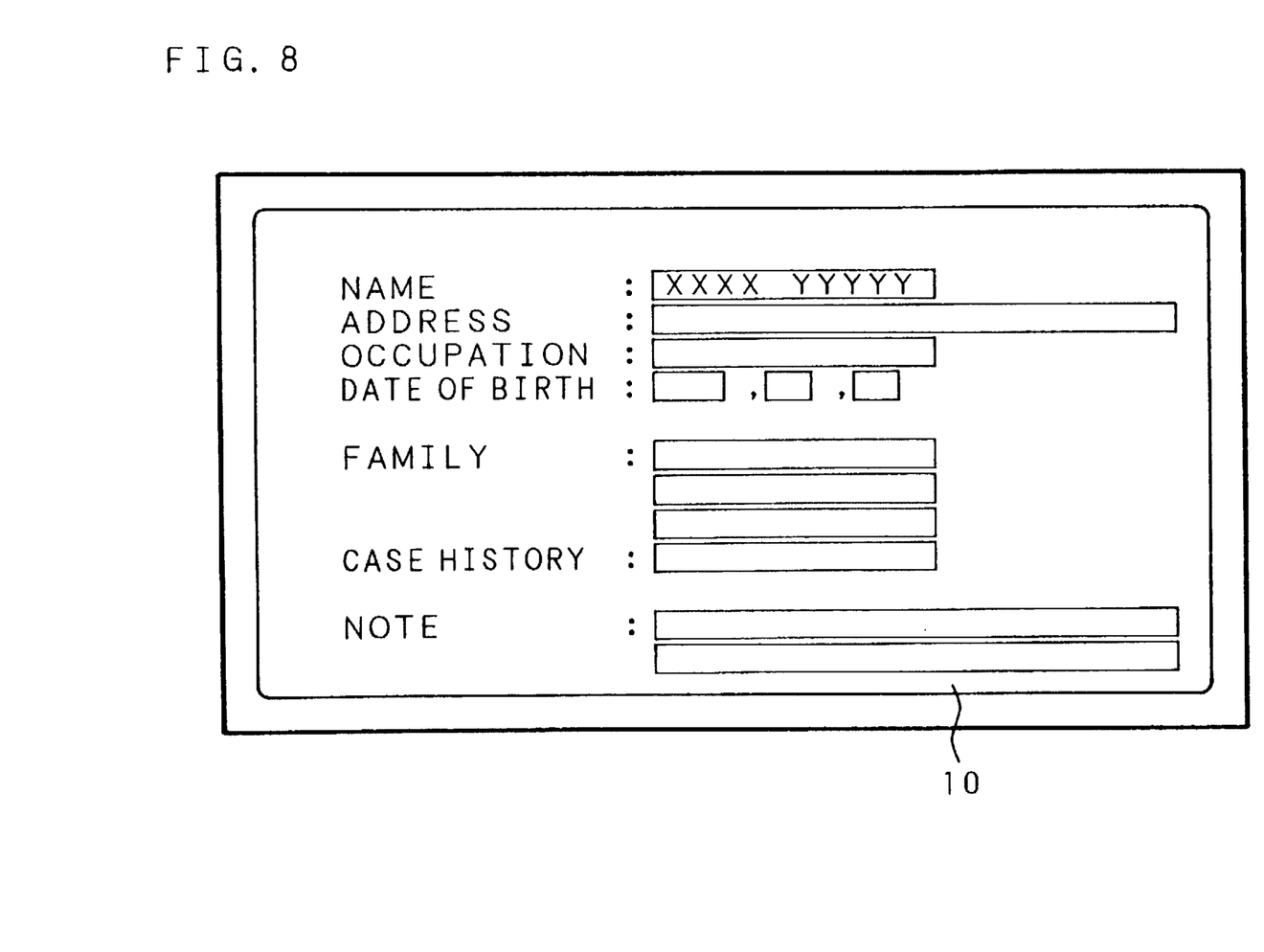
FIG. 8 is an explanatory view showing an embodiment of the display change.

The mode of changing the display described above is released when the input pen 2 is moved away from the tablet surface 10 and the ordinary display instruction generated in response to the determination in step 4 that the input pen 2 is at a remote position. FIG. 8 shows an example of the ordinary display after releasing the changed display. In this display form, the results of the hand-writing input are displayed in the corresponding positions. This return to the ordinary display is performed, similar to write on paper, by a natural operation in which the input pen 2 is moved away from the tablet surface 10 after the actual hand-writing input, so that the operability is improved.

Meanwhile, a region allowing the coordinate specifying input may be displayed on a portion of the tablet surface 10 after the display change, so that the display change may be released in accordance with the coordinate specifying input with the input pen 2 performed by the above display. According to this structure, results of the input can be confirmed successively during the hand-writing input, so that input error can be prevented.

Figure 9:
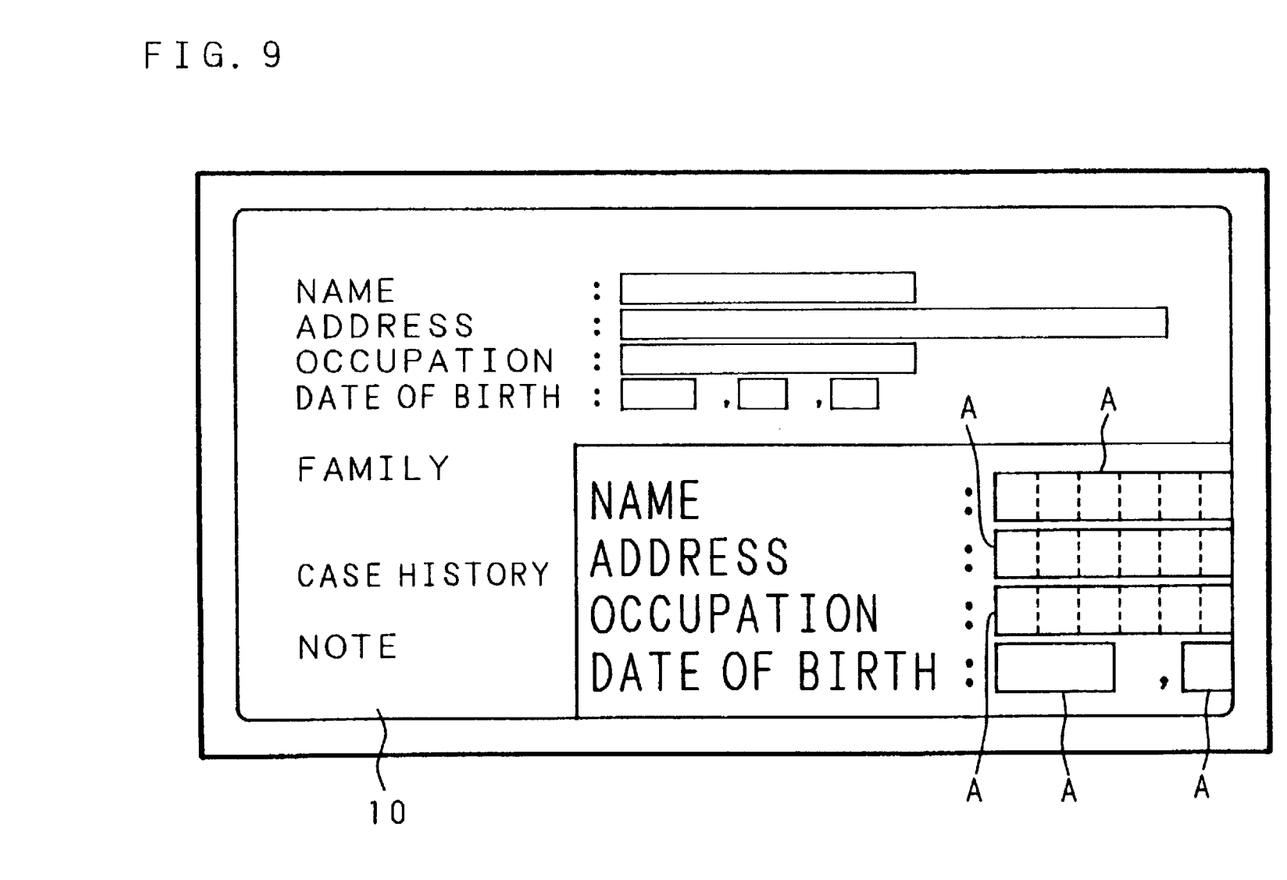
FIG. 9 is an explanatory view showing another embodiment of the display change.
Figure 10:
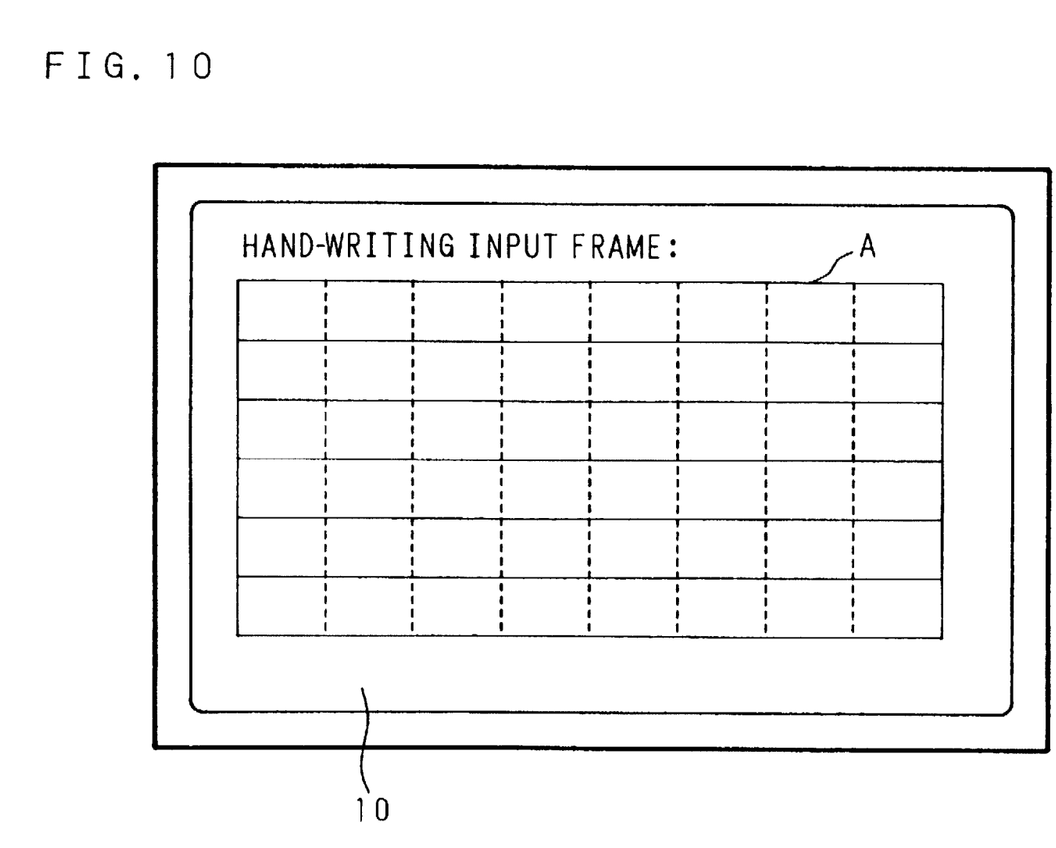
FIG. 10 is an explanatory view showing another embodiment of the display change.

FIGS. 9 and 10 show another examples of display change. In the display form in FIG. 9, the input pen approach region is shifted to a predetermined position and magnified on a predetermined scale. As shown in the figure, the display region is set at a position different from the approach region, so that the hand-writing input can be performed while confirming the ordinary display state, resulting in convenient operation. The above display is achieved by the operation of the shift processing unit 6d and magnification/ reduction processing unit 6c.

According to the display in FIG. 10, the input pen approach region is changed into a predetermined display form. In this case, the hand-writing input region A can be set without restriction of the display area for the ordinary display, which is effective for hand-writing input of a large number of contents. This display mode is achieved by the operation of the display change processing unit 6a.

According to the pen input device of the invention, as described above, when the pen position recognition processing means recognizes the fact that the input pen is in a near position, the display processing means operates to change the images on the display screen in accordance with the above recognition. Therefore, the display on the tablet surface is changed into the form suitable to the hand-writing input by the operation of moving the input pen toward an intended position, and the hand-writing input is performed in accordance with this display, so that the hand-writing input onto the input screen can be performed with the same feeling as the hand-writing onto paper without an error, resulting in improvement of operability.

The change of display is performed only when a predetermined display including, in particular, the input admitting frame for hand-writing input is active, so that the display change is performed only when required, resulting in improvement of operability.

The change of display is performed, for example, by magnification and/or shift of a partial display region or by changing a partial region on the display screen to display a predetermined images, so that the hand-writing input can be performed easily in accordance with the obtained display.

The region which the input pen is approaching is specified on the input screen, and the display in the region corresponding to the specified region is changed, so that the display of only the desired region is changed, and the hand-writing input can be performed easily in accordance with the change display even when the display form contains a large number of input frames.

When the input pen is in a remote position, or a predetermined coordinate specifying input is performed with the input pen, the display change mode is released in response to this, so that the results of input can be confirmed without complicated operation, resulting in advantages of the invention such that, for example, the hand-writing input can be performed without an error.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such mates and bounds thereof are therefore intended to be embraced by the claims.

What is claimed is:

1. A pen input device comprising:

a tablet having a display screen for displaying displayed images and an input screen integral with the display screen;

an input pen for performing coordinate specifying input by contact with said input screen and hand-writing input by contact scanning on said input screen;

pen position recognizing means for recognizing whether said input pen is in a near position or a remote position with respect to said input screen; and display processing means for changing displayed images on said display screen when said input pen is in the near position by said pen position recognizing means, wherein the operation of said display processing means is released in response to recognition of the remote position performed by said pen position recognizing means so as to display unchanged displayed images.

2. A pen input device comprising:

a tablet having a display screen for displaying displayed images and an input screen integral with the display screen;

an input pen for performing coordinate specifying input by contact with said input screen and hand-writing input by contact scanning on said input screen;

pen position recognizing means for recognizing whether said input pen is in a near position or a remote position with respect to said input screen; and display processing means for changing displayed images on said display screen when said input pen is in the near position by said pen position recognizing means, wherein the operation of said display processing means is released in response to predetermined coordinate specifying input performed by said input pen so as to display unchanged displayed images.

* * * * *